(12) United States Patent
Sharma (10) Patent No.: US 6,288,798 B1
(45) Date of Patent: Sep. 11, 2001

(54) SHOW-THROUGH COMPENSATION APPARATUS AND METHOD

(75) Inventor: Gauray Sharma, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/200,984

(22) Filed: Nov. 30, 1998

(51) Int. Cl.$^7$ ....................................................... H04N 1/40
(52) U.S. Cl. .......................... 358/448; 382/275; 382/274
(58) Field of Search .................................... 358/400, 401, 358/448, 464, 300, 296; 382/275, 254

(56) References Cited

U.S. PATENT DOCUMENTS

| | | |
|---|---|---|
| 5,646,744 * | 7/1997 | Knox ..................................... 358/401 |
| 5,832,137 * | 11/1998 | Knox ..................................... 382/275 |

OTHER PUBLICATIONS

Simon Haykin, "Adaptive Filter Theory—Second Edition", 1991, pp. vii–xii, 1–3, 16–17, 19, 157–161, 164–168, 273–279, 302–304.

* cited by examiner

*Primary Examiner*—Jerome Grant, II
*Assistant Examiner*—Negussie Worku
(74) *Attorney, Agent, or Firm*—Oliff & Berridge, PLC (57) ABSTRACT

Apparatus and methods that adjust image data for show-through image information of an image on a back side of an image bearing substrate on an image on the front side of the image bearing substrate. Image data for a front side image and a back side image of an image bearing substrate is obtained from an optical sensor that senses light reflected from the image bearing substrate. The image data is stored in a memory and is used to determine scanned density data and approximate absorbency data for the front side and the back side of the image bearing substrate. Show-through compensated density data for the front side image is computed by filtering the absorbency data for the back side with a filter characteristic of the show-through characteristics of the image bearing substrate and subtracting this filtered absorbency data from the front side scanned density data. Show-through compensated density data for the back side image is computed by filtering the absorbency data for the front side with a filter characteristic of the show-through characteristics of the image bearing substrate and subtracting this filtered absorbency data from the back side scanned density data. If required, the show-through compensated density data for the front and back side images is converted into show-through compensated reflectance images for the front and back side.

22 Claims, 6 Drawing Sheets

FRONT SIDE

SHOW-THROUGH COMPENSATION APPARATUS AND METHOD

BACKGROUND OF THE INVENTION

1. Field of Invention

This invention is directed to apparatus and methods that compensate for show-through of images from a back side of a translucent image bearing substrate when scanning the images.

2. Description of Related Art

When a user wishes to reproduce an image on an image bearing substrate or obtain an electronic version of the image on the image bearing substrate, the image bearing substrate on which the image is formed is passed within a detection field of an optical sensor. The passing of the image bearing substrate within the detection field of the optical sensor is termed "scanning" the image bearing substrate. The optical sensor detects light reflected from the surface of the image bearing substrate and obtains data representing the reflected light. The data obtained is an electronic representation of the images formed on the image bearing substrate, because the colors and shadings of the images on the image bearing substrate reflect different amounts and wavelengths of light.

When a double-sided translucent image bearing substrate, having images on both sides of the image bearing substrate, is scanned, the electronic representation generated by scanning one side of the image bearing substrate will contain information from both sides of the image bearing substrate due to light passing through the image bearing substrate. The high contrast image information of the scanned side, or front, of the image bearing substrate will be combined with the low contrast image information from the back side of the image bearing substrate. This low contrast image information from the back side of the image bearing substrate is called "show-through" image information.

One way in which show-through image information is reduced is to place a black backing on the back side of the image bearing substrate during scanning. The light that passes through the image bearing substrate is absorbed by the black backing. Although there is a significant reduction of the show-through image information, there is a small residual low contrast image of the back side remaining in the scanned image due to light scattering off the back side of the image bearing substrate.

Additionally, this method is undesirable because with a black backing any perforations in the image bearing substrate and regions beyond the edges of the image bearing substrate appear as black regions in the scanned image.

SUMMARY OF THE INVENTION

This invention provides apparatus and methods that compensate for show-through of images from a backside of a translucent image bearing substrate when reproducing the images.

Image reflectance data for a front side and back side of an image bearing substrate is obtained from an optical sensor that senses light reflected from an image bearing substrate. The image reflectance data is stored in a memory and is used to determine scanned density data and approximate absorbency data for the front side and the back side of the image bearing substrate.

In accordance with an imaging model proposed here, show-through compensated density data for the front side image is obtained by subtracting a low pass filtered version of the back side absorbency data from the scanned density data for the front side. Likewise, show-through compensated density data for the back side image is obtained by subtracting a low pass filtered version of the front side absorbency data from the scanned density data for the back side. A point spread function for the low pass filter is estimated either statically or adaptively in accordance with standard linear prediction theory. The show-through compensated density data for the two sides may be transformed back to show-through compensated reflectance data for each side.

The adjusted image data may then be stored in memory for later use when reproducing the image. In this manner, a reproduced image with no show-through may be obtained.

BRIEF DESCRIPTION OF THE DRAWINGS

Exemplary embodiments of the apparatus and methods of this invention will be described with reference to the following figures, wherein like numerals designate like elements, and wherein.

DETAILED DESCRIPTION OF PREFERRED EMBODIMENTS

Figure 1:
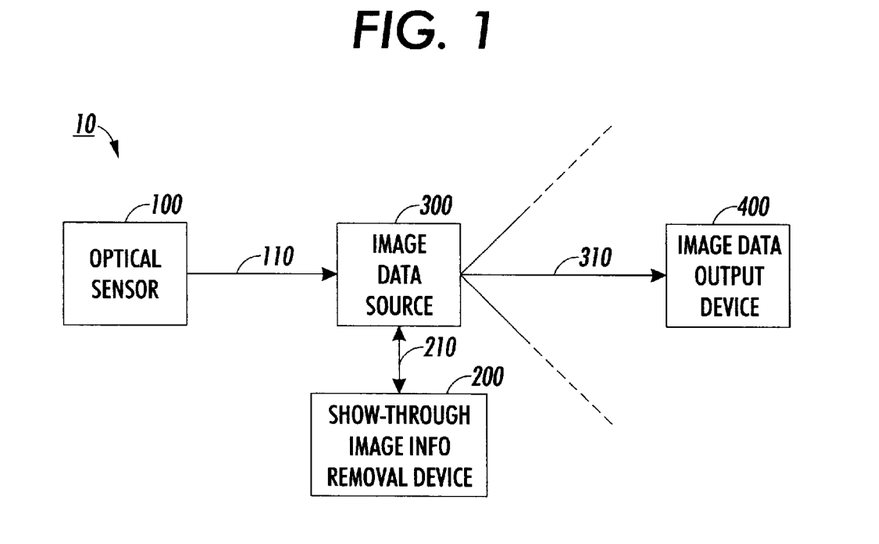
FIG. 1 is a functional block diagram of one exemplary embodiment of a show-through compensation system according to this invention.

FIG. 1 shows a functional block diagram of one exemplary embodiment of a show-through compensation system 10 according to this invention. As shown in FIG. 1, the show-through compensation system 10 includes an optical sensor 100, a show-through image information removal device 200, an image data source 300, and an image data output device 400. These devices are coupled together via data communication links 110, 210 and 310, respectively. These communication links 110, 210 and 310 may be any type of communication link that permits the transmission of data. For example, the communication links may be direct serial or parallel connections, a local area network (LAN), a wide area network (WAN), an intranet, the Internet, circuit wirings, and the like.

The optical sensor 100 is any type of device that detects light input and translates the light input into image data For example, the optical sensor 100 may be a scanning array of photosensitive sensors such as CCDs or photodiodes which are controlled to sense light reflected from an image bearing substrate. The optical sensor 100 may be a single sensor or a plurality of sensors. Additionally, the optical sensor 100 may be a plurality of sensors positioned such that both sides of an image bearing substrate are scanned simultaneously, as described in U.S. Pat. No. 5,646,744 to Knox, which is incorporated herein by reference in its entirety.

The optical sensor 100 provides image data to an image data source 300 via the communication link 110. The image data source 300 stores the image data in memory. The image data source 300 provides the image data to the show-through image information removal device 200 via the communication link 210 when show-through image information is to be removed. The show-through image information may be removed immediately after the image data is obtained or may be removed at some time after the image data is obtained. Furthermore, show-through image information may be removed when adjusted image data is to be sent to the image data output device 400.

The show-through image information removal device 200 adjusts the image data to compensate for the effects of show-through image information in the electronic image data generated by scanning the image bearing substrate. The image data is adjusted to generate adjusted image data, which is output to the image data source 300 via the communication link 210.

The image data source 300 is any type of device that is capable of receiving the adjusted image data and supplying image data to the image data output device 400. For example, the image data source 300 may be a computer, a microprocessor, a scanner processor, a disk drive, a tape drive, a hard disk, zip drive, CD-ROM drive, DVD drive, a network server, a print server, photocopying device or any other known or later developed device or system that is able to receive and provide image data.

The image data source 300 may include a plurality of components including displays, user interfaces, memories, disk drives, and the like. For simplicity of the following description of the preferred embodiments, it will be assumed that the image data source 300 is a personal computer.

The image data source 300 stores the adjusted image data received from the show-through image information removal device 200 and provides the adjusted image data to the image data output device 400 over the communication link 310 when the image is to be output. The image output device 400 is any type of device that is capable of outputting an image. For example, the image output device 400 may be a laser printer, bubble jet printer, ink jet printer, photocopying machine, cathode ray tube (CRT), computer monitor, television, camera, or any other known or later developed device or system that is able to generate an image on a recording medium or display an image using image data or data generated from the image data. The image output device 400 generates an image based on the adjusted image data from the image data source 300. While FIG. 1 shows a single image output device 400, multiple image output devices 400 may be coupled to the image data source 300.

Any combination of the elements of FIG. 1 may be integrated into a single device. For example, the optical sensor 100, the show-through image information removal device 200, the image data source 300, and the image output device 400 may be contained within a single device such as a digital copier, a computer with a built-in printer, or any other integrated device that is capable of outputting an image. Similarly, the optical sensor 100 and the show-through image information removal device 200 may be integrated into a single device, such as in a scanner or the like.

Alternatively, the show-through image information removal device 200 and the image data source 300 may be combined into a separate integrated device attachable upstream of a stand-alone image output device 400. For example, the show-through image information removal device 200 and the image data source 300 may be an integrated device which interfaces with both the optical sensor 100 and one or more image output devices 400. For example, the show-through image information removal device 200 and the image data source 300 may be incorporated into a programmed general purpose computer, a network print server that manages printer data for a plurality of the same or different printer devices, and the like.

Furthermore, the show-through image information removal device 200 may be implemented as software executing on the optical sensor 100, the image data source 300 or the image output device 400. Other configurations of the elements shown in FIG. 1 may be used without departing from the spirit and scope of this invention.

The term "image," as used herein, refers to any image containing any, or all, of one or more halftone images, continuous tone images, line art or other graphics images, and/or any compilation of text, that is capable of being displayed on a display device or output on an image bearing substrate. For example, an image may be a combination of graphics and text that is stored in the image data source 300. The image may be a series of pixel values denoting the color, intensity, and/or any other known or later developed image property of the particular pixels that make up the image.

The optical sensor 100 detects light reflected from the image bearing substrate and translates the detected light into image data that is provided to image data source 300 and, in turn, to the show-through image information removal device 200. The show-through image information removal device 200 adjusts detected image data to remove any show-through image information and forwards the adjusted image data to the image data source 300. The image data source 300 stores the adjusted image data and outputs the adjusted image data to the image data output device 400 when the image is to be output.

When the optical sensor 100 is used to detect reflected light from the image bearing substrate, the image bearing substrate is scanned twice. The first scan of the image bearing substrate is of the front side of the image bearing substrate and the second scan of the image bearing substrate is of the back side of the image bearing substrate. These scans may be performed sequentially or simultaneously. Simultaneous scanning of a duplex image bearing substrate is disclosed, for example, in incorporated U.S. Pat. No. 5,646,744.

Thus, each scan of the image bearing substrate provides different image data corresponding to the image on the side of the image bearing substrate scanned with some show-through of the image on the opposite side of the image bearing substrate. The image data for both sides of the image bearing substrate is provided by the image data source 300 to the show-through image information removal device 200.

Figure 2:
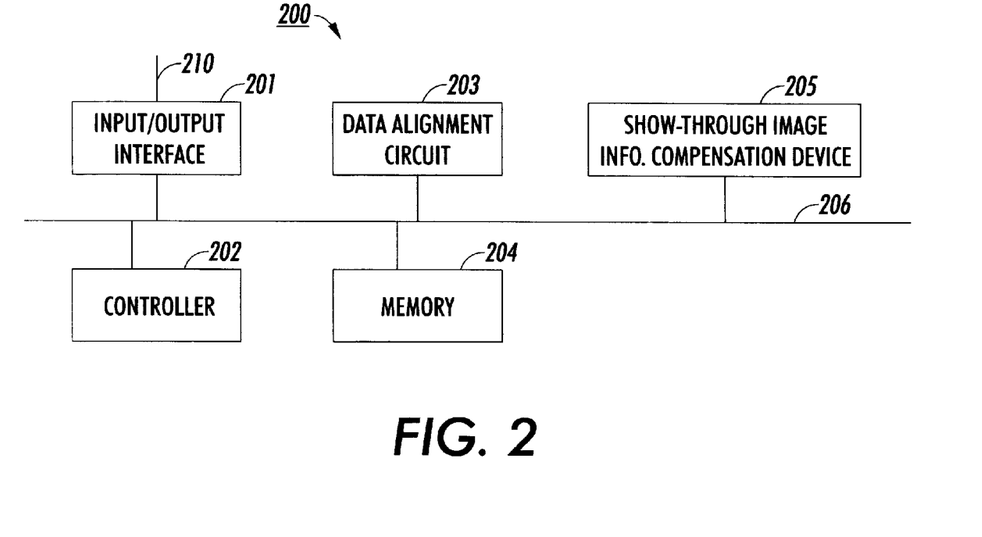
FIG. 2 is an exemplary functional block diagram of the show-through removing device of FIG. 1.

FIG. 2 is a block diagram of one exemplary embodiment of the show-through image information removal device 200 of FIG. 1. As shown in FIG. 2, the show-through image information removal device 200 includes an input/output interface 201, a controller 202, a data alignment circuit 203, a memory 204, and a show-through image information cancellation device 205. These elements are connected to one another via the control/data signal bus 206.

The image data is provided to the show-through image information removal device 200 by the image data source 300 via the communication link 110 and the input/output interface 201. The controller 202 causes the image data sent by the image data source 300 to be stored in the memory 204.

Once the image data is received from the image data source 300, the controller 202 instructs the data alignment circuit 203 to align the image data corresponding to the front side of the image bearing substrate with image data corresponding to the back side of the image bearing substrate. The back side image data will be reversed from the front side image data. Thus, when comparing information for the two sides, one of the images should be reversed so that the two images will correspond.

After reversing one of the images, the front side image data should be aligned with the reversed back side image data. Because the images are acquired at different times, or by different sensors, they are not necessarily scanned with the same spatial reference. Skew alignment, lateral shifts, and linear distortions of the image all may be required.

When the front side and the back side images are simultaneously scanned, these adjustments can be determined from the geometry of the scanner, or by a calibration process which scans a test target and notes the spatial displacement of target features. The data alignment circuit 203 may also perform alignment determinations based on, for example, alignment marks on the image bearing substrate or an image bearing substrate support, edge detection, or any other known or later developed alignment method.

The alignment requirement may be relaxed through the choice of filters used to determine show-through cancellation values, as discussed in more detail below. Thus, exact alignment is not necessary to practicing the invention. However, some alignment is desirable to reduce error in the show-through cancellation determinations. Additionally, aligning the front side and back side image data may be omitted and the data alignment circuit 203 omitted from the show-through image information removal device 200 without departing from the spirit and scope of this invention.

In one exemplary embodiment, once the image data is aligned by the data alignment circuit 203, the show-through image information cancellation device 205 cancels the show-through image information from the image data. To cancel the show-through image information, scanned density and absorbency functions of the front and back side image layers are computed and show-through compensated densities of the front side and back side images are computed by subtracting filtered absorbency data from the scanned density data The resulting adjusted image data is stored in the memory 204 and then output to the image data source 300 via the input/output interface 201 and the communication link 210.

FIGS. 3–6 illustrate one exemplary method for adjusting image data to compensate for the show-through image information. The method described with reference to FIGS. 3–6 is only exemplary and is not meant to limit the invention to any one method. Rather, any method for compensating for the show-through image information that uses linearized density functions to compensate for the show-through image information may be used without departing from the spirit and scope of this invention.

Figure 3:
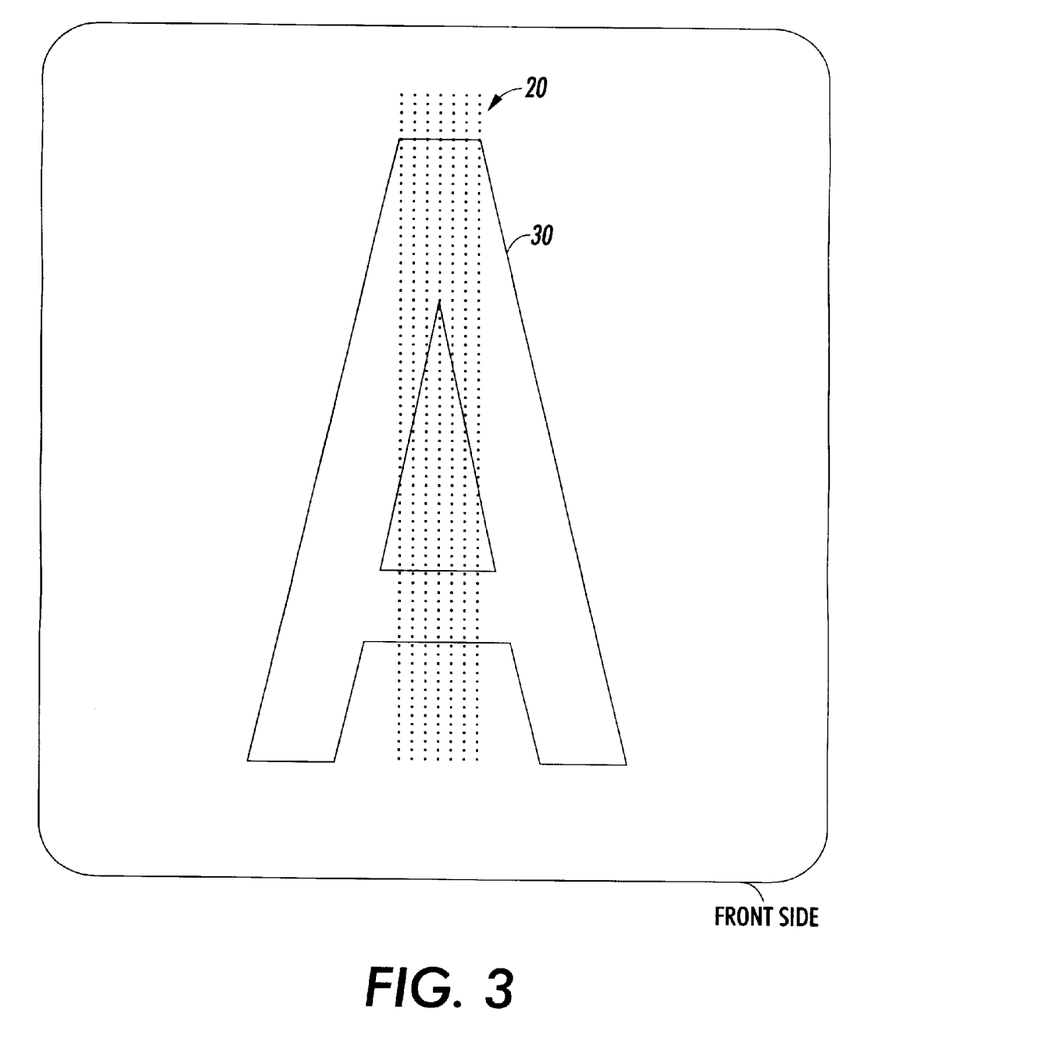
FIG. 3 is an exemplary diagram of an image on the front side of an image bearing substrate and an image on the back side "showing through" to the front side.

FIG. 3 shows the image data generated by scanning a front side of an image bearing substrate image that includes show-through image information of an image from the back side of the image bearing substrate. As can be seen from FIG. 3, the vertical line 20 shows through from the back side of the image bearing substrate and is present in the image data of the image 30 of the letter "A" generated from scanning the front side of the image bearing substrate.

Figure 4:
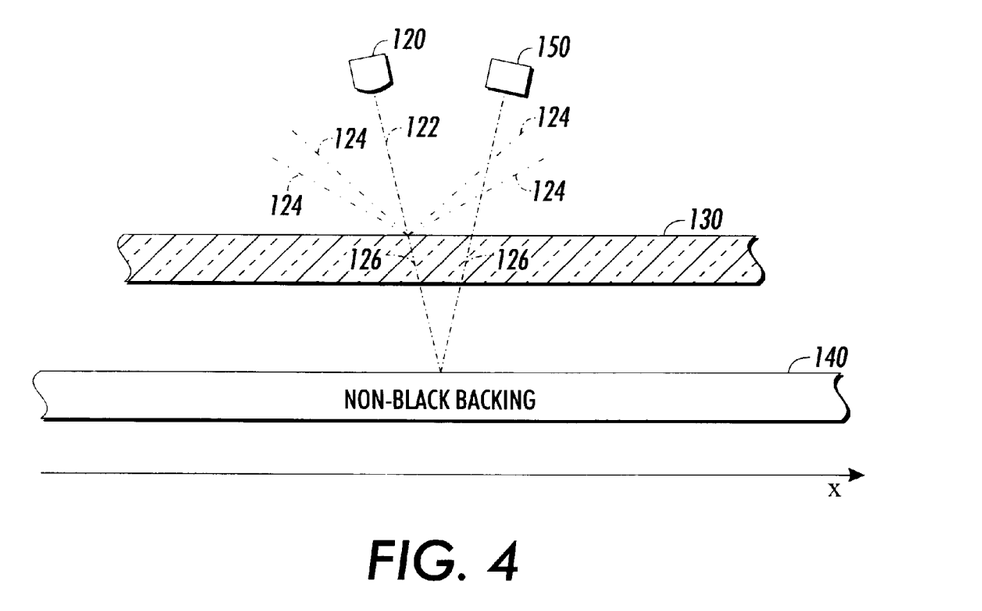
FIG. 4 illustrates the light paths that occur when scanning an image bearing substrate that does not have an image formed on it.

FIG. 4 illustrates the light paths that occur when scanning a translucent image bearing substrate using a non-black backing. In the example shown in FIG. 4, the translucent image bearing substrate does not have any images formed on it. Light 122 from a light source 120 is directed upon the translucent image bearing substrate 130. The light 122 from the light source 120 is incident on the front surface of the image bearing substrate 130. Portions 124 of the light 122 are scattered by the image bearing substrate 130. Other portions 126 of the light 122 are transmitted through the translucent image bearing substrate 130.

The portions 126 of the light 122 transmitted through the translucent image bearing substrate 130 are reflected by the non-black backing 140 back through the image bearing substrate 130 to an optical sensor 150. While FIG. 4 shows the reflected light 126 being reflected at a large angle, in actuality this angle is quite small and is considered to be zero. The figure is illustrative only and is not meant to be limiting in any way.

The reflectance $R_p^w$ detected by the optical sensor 150 may be represented as:

$$R_p^w = S_p + T_p^2 R_{back} \qquad (1)$$

where:

$R_p^w$ is the reflectance detected by the optical sensor 150;

$S_p$ represents the fraction of portions 124 of the light 122 that are scattered;

$R_{back}$ represents the reflectance of the non-black backing; and $T_p$ represents the fraction of portions 126 of the light 122 that are transmitted through the image bearing substrate. The subscript p denotes a paper image bearing substrate and the superscript w in $R_p^w$ indicates that this is the reflectance for paper that is without print on either side (white). However, this invention is not limited to using paper, but may use any image bearing substrate. Thus, Eq. 1 shows that the reflectance $R_p^w$ detected by the optical sensor 150 is the sum of the fraction $S_p$ of the light 122 that is scattered and product of the backing reflectance $R_{back}$ and the square of the fraction $T_p$ of the light 122 transmitted through the image bearing substrate 130, for example paper. The product of $R_{back}$ and the square of the fraction $T_p$ of the light 122 transmitted through the paper is used to represent the amount of light that is transmitted through the paper image bearing substrate to the non-black backing, reflected therefrom and further transmitted back through the paper image bearing substrate to the optical sensor 150.

Figure 5:
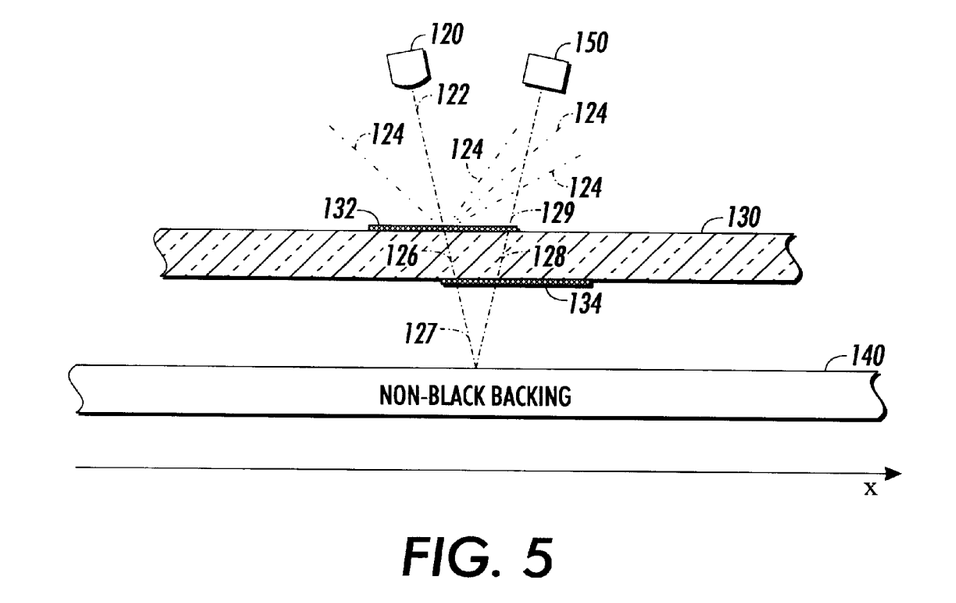
FIG. 5 illustrates the light paths that occur when scanning an image bearing substrate that has images on both the front side and back side of the image bearing substrate.

FIG. 5 illustrates the light paths that occur when scanning an image bearing substrate that has images formed on the front and back sides. The following discussion assumes that the front and back side images are black and white images. However, as will be apparent to one of ordinary skill in the art, similar light paths will occur with color or grayscale images.

As shown in FIG. 5, the light 122 from the light source 120 is incident on the image bearing substrate 130. Portions 124 of the light 122 are scattered by the front side of the image bearing substrate 130. The remaining portion 126 of the light 122 is transmitted through the front side. The fractions of the light 122 that are scattered and that are transmitted depends on the characteristics of the image formed on the front side of the image bearing substrate 130.

The portion 126 of the light 122 transmitted through the front side of the image bearing substrate 130 is then transmitted through the back side of the image bearing substrate 130. The portion 127 of the light 122 that is transmitted through the back side of the image bearing substrate is dependent on the characteristics of the image on the back side of the image bearing substrate and the image bearing substrate itself.

The transmitted portion 127 of the light 122 is then reflected back from the backing 140 through the back and front sides of the image bearing substrate to the optical sensor 150. The portion 128 of the light 122 represents the portion of light that is transmitted through the back side of the image bearing substrate. Portion 128 may not be the same as portion 127 since some of the portion 127 of light 122 may be absorbed by the non-black backing 140 or may be scattered by the back side of the image bearing substrate 130. The portion 129 of the light 122 represents the portion of light passing through the front side of the image bearing substrate 130. This portion 129 may not be the same as portion 128 due to, for example, the spread of light through the image bearing substrate 130.

Thus, the reflected portion 129 of the light 122 detected by the optical sensor 150 may be represented as:

$$R_f^s(x, y) = T_f^2(x, y)(S_p + T_p^2 R_{back} T_b^2(x, y)) \quad (2)$$

where:

$R_f^s(x, y)$ is the reflectance detected by the optical sensor 150 when the front side is scanned;

x and y are the two-dimensional coordinates of a point on the surface of the image bearing substrate 130;

$T_f(x, y)$ is the transmittance of the image layer of the front side of the image bearing substrate 130; and $T_b(x, y)$ is the transmittance of the image layer of the back side of the image bearing substrate 130. Eq. 2 demonstrates that the reflectance $R_f^s(x, y)$ detected by the optical sensor 150 is based on the transmittances $T_f(x, y)$ and $T_b(x, y)$ of light through the front and back image layers of the image bearing substrate 130. In particular, the dependence of $R_f^s(x, y)$, the scanned reflectance of the front side, on $T_b(x, y)$, the transmittance of the back side image layer, is the undesirable show-through that this invention eliminates.

For the purpose of the following description, it will be assumed that the "show-through compensated image" that is to be recovered is the image that would have been obtained from the optical sensor if there was no image on the back side of the image bearing substrate. This assumption is only for descriptive purposes and is not intended to limit the scope of the invention. Alternate definitions of the "show-through compensated image" may be used without departing from the spirit and scope of the present invention.

The assumption that there is no image on the back side is mathematically equivalent to setting the transmittance $T_b(x, y)$ of the back side image layer to unity in Eq. 2. Making this substitution, the reflectance for the show-through compensated front side image is:

$$R_f(x, y) = T_f^2(x, y)(S_p + T_p^2 R_{back}) \quad (3)$$

The goal of show-through compensation is to obtain $R_f(x, y)$. For reasons that will become apparent later, it is advantageous to convert Eq. 2 into a normalized density space obtained by taking a logarithmic transformation of the reflectance data after dividing by the reflectance of the unprinted (on either side) substrate.

The normalized density of the front side image corresponding to scanning of the image bearing substrate 130 shown in FIG. 5 may be represented as:

$$D_f^s(x, y) = -\ln(R_f^s(x, y)/R_p^w) = -\ln(T_f^2(x, y)) - \ln((S_p + T_p^2 R_{back} T_b^2(x, y))/(S_p + T_p^2 R_{back})) \quad (4)$$

which simplifies to:

$$D_f^s(x, y) = D_f(x, y) - \ln(1 - (T_p^2 R_{back}/(S_p + T_p^2 R_{back}))(1 - T_b^2(x, y))) \quad (5)$$

where:

$$D_f(x, y) = -\ln(R_f(x, y)/R_p^w) = -\ln(T_f^2(x, y)) \quad (6)$$

is the normalized density corresponding to the show-through compensated front side image. While Eq. 4 uses the natural logarithm, any logarithm of base m ($\log_m$) or any function that closely approximates the logarithm may be used without departing from the spirit and scope of this invention.

Paper is close to white in color because paper scatters much more light than it transmits. Thus, when the image bearing substrate 130 is paper or like paper in that it scatters a larger fraction of the light than it transmits, the squared transmittance fraction $T_p^2$ of the light is very small compared to the fraction scattered $S_p$ of the light. This allows the following approximation, for values of x having magnitudes much smaller than 1:

$$\ln(1-x) \approx -x \quad (7)$$

Using this approximation with $x = (T_p^2 R_{back}/(S_p + T_p^2 R_{back}))(1 - T_b^2(x, y))$ in Eq. 5, the density function of the front side image becomes:

$$D_f^s(x, y) = D_f(x, y) + (T_p^2 R_{back}/(S_p + T_p^2 R_{back}))(1 - T_b^2(x, y)) = D_f(x, y) + (T_p^2 R_{back}/(S_p + T_p^2 R_{back})) A_b(x, y) \quad (8)$$

where $A_b(x, y) = 1 - R_b(x,y)/R_p^w = (1 - T_b^2(x, y))$ and is the show-through compensated absorbency of the back side image layer. Hence Eq. 8 states that the scanned density of the front side image layer $D_f^s(x, y)$ is a linear combination of the show-through compensated density of the front side image layer $D_f(x, y)$ and the show-through compensated absorbency of the back side image layer, $A_b(x, y)$. Similarly, the density of the scanned back side image layer is:

$$D_b^s(x, y) = D_b(x, y) + (T_p^2 R_{back}/(S_p + T_p^2 R_{back})) A_f(x, y) \quad (9)$$

where $A_f(x, y)$ is the absorbency of the front side image layer.

In actual practice, the light passing through the image bearing substrate is spread spatially within the image bearing substrate. Therefore, the above relations do not exactly hold. To take into account the spreading of light within the image bearing substrate, Eqs. 6 and 7 can be modified by replacing the term $(T_p^2 R_{back}/(S_p + T_p^2 R_{back}))$ with a point spread function $H(x,y)$. The modified equations become:

$$D_f^s(x, y) = D_f(x, y) + H(x, y) \hat{x} A_b(x, y) \quad (10)$$

$$D_b^s(x, y) = D_b(x, y) + H(x, y) \hat{x} A_f(x, y) \quad (11)$$

where:

$H(x, y)$ is a combined point-spread function for two-way transmission, reflection at the backing, and spreading of light through the image bearing substrate, referred hereafter to as the show-through point spread function of the image bearing substrate (and backing); and $\hat{x}$ is the convolution operation.

Note that from Eqs. 10 and 11 it is clear that the normalized densities for the show-through compensated front and back side images can be computed as:

$$D_f(x, y) = D_f^s(x, y) - H(x, y) \hat{x} A_b(x, y) \quad (12)$$

$$D_b(x, y) = D_b^s(x, y) - H(x, y) \hat{x} A_f(x, y) \quad (13)$$

The terms $D_f^s(x, y)$ and $D_b^s(x, y)$ can be determined from the scans of the two sides of the image bearing substrate. For example, the optical sensor 150 may detect values of the reflectance $R_f^s(x, y)$ of the front side of the image bearing substrate. The reflectance $R_b^w$ for the unprinted image bearing substrate can be computed by averaging over $R_f^s(x, y)$ over a region in which there is no printing on either side of the document, or by independent measurement. These values may be used in conjunction with Eq. 4 to determine $D_f^s(x, y)$ and $D_b^s(x, y)$ may be similarly determined from the reflectance $R_b^s(x, y)$ detected by the sensor for the back side. The show through point-spread function $H(x, y)$ may be obtained using filters as discussed in detail below. As mentioned above, the entries in $H(x, y)$ correspond approximately to $(T_p^2 R_{back}/(S_p + T_p^2 R_{back}))$ which are small because, for typical image bearing substrates, the transmission through the substrate $T_p$ is much smaller than the scattering $S_p$. Because these values are small, approximations may be made, for example, for the absorbency of the front and back layers and only a small error will be introduced. The absorbencies $A_b(x, y)$ and $A_f(x, y)$ for the back and front side image layers, respectively, may be approximated by replacing the true show-through compensated reflectances with the reflectances detected with the scanner as:

$$A_b(x, y) = 1 - R_b(x,y)/R_p^w \approx 1 - R_b^s(x,y)/R_p^w \quad (14)$$

$$A_f(x, y) = 1 - R_f(x,y)/R_p^w \approx 1 - R_f^s(x,y)/R_p^w \quad (15)$$

Alternatively, if necessary, instead of this approximation an iterative approach may be used beginning with the above approximation and using the estimated show-through compensated reflectances for computing the absorbencies for the next iteration. These iterations may be repeated for a number of times until acceptable compensation is obtained.

The show-through point spread function $H(x, y)$ may be approximated using a finite-impulse-response (FIR) filter. Since the show-through compensation is linearized, the coefficients for the FIR filter representing $H(x, y)$ can be determined from standard linear prediction theory as discussed, for example, in *Adaptive Filter Theory*, S. Haykin, Second Edition, Prentice Hall, 1991, which is incorporated herein by reference.

The show-through point spread function is dependent only on the backing and the image bearing substrate and may be pre-determined or may be estimated by using a region of the image with printing only on the back-side in accordance with optimal linear filtering theory as described in *Adaptive Filter Theory*. Alternatively, adaptive linear prediction filters may be used, also as taught in *Adaptive Filter Theory*. In the preferred embodiments, the filter representing the show-through point spread function $H(x, y)$ is implemented as an adaptive filter and its coefficients (values for different x and y) are adapted as one moves across the image bearing substrate. For the show-through compensation on the front side, the density of the show-through compensated image at each x, y location is computed in accordance with Eq. 12. Then, if a small neighborhood about that location x, y has no image content in the front side but some image content on the back side, the coefficients of the filter are adapted in a direction designed to send estimated $D_f(x, y)$ towards zero (note that $D_f(x, y)$ is zero in a region with no printing on the front side if there is no show-through).

The use of adaptive filters has a significant advantage over non-adaptive filters in that the registration of the front and back side images is not required to be extremely precise. As long as the filter size is reasonably large, the filter automatically adapts and compensates for small changes in the registration over the image bearing substrate. The adaptive method is also beneficial in that it can account for variations in the show-through point spread function due to the spatial variations in the transmittance of the image bearing substrate.

$D_f(x, y)$ and $D_b(x, y)$ represent the normalized densities for the show-through compensated images of the front and back side of the image bearing substrate. These values may be transformed into alternate representations of the show-through compensated images, such as the reflectance representation obtained as the inverse of Eq. 6 (and the corresponding equation for the back side):

$$R_f(x, y) = R_p^w \exp(-D_f(x, y)) \quad (16)$$

$$R_b(x, y) = R_p^w \exp(-D_b(x, y)) \quad (17)$$

As already noted earlier, $R_f(x, y)$ is a close approximation to the image that the optical sensor would have sensed on the front side if there were no printing on the back side and $R_b(x, y)$ is a close approximation to the image that the optical sensor would have detected on the back side if there were no printing on the front side. Note also that the show-through compensation only needs local information from corresponding front and back side images and therefore does not require the complete front and back side images to be stored in memory (in a device that scans front and back sides simultaneously the delay introduced by the processing would be only a few scan lines).

The show-through adjusted image data is stored in memory and may also be stored in the image data source 300 for later use in outputting the image using, for example, the image output device 400.

Figure 6:
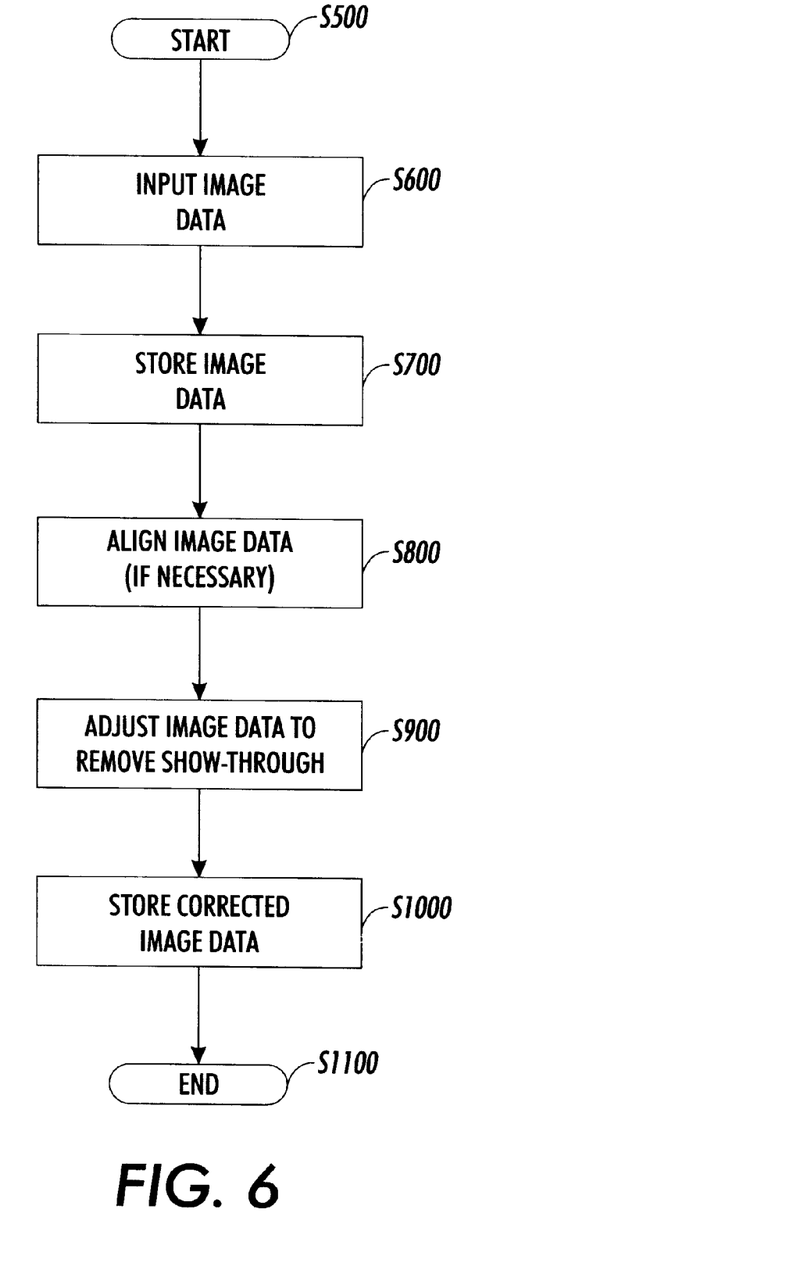
FIG. 6 is a flowchart outlining an exemplary method for adjusting detected image data to remove show-through image information according to this invention.

FIG. 6 is a flowchart outlining one exemplary embodiment of a method of compensating for show-through image information in image data. As shown in FIG. 6, beginning in step S500, control continues to step S600, where the image data is input. Next, in step S700, the image data is stored. Then, in step S800, if necessary, the image data is aligned. Control then continues to step S900.

In step S900, the image data is adjusted to remove any show-through image information. Then, in step S1000, the adjusted image data is stored. Next, in step S1100, the control routine ends.

Figure 7:
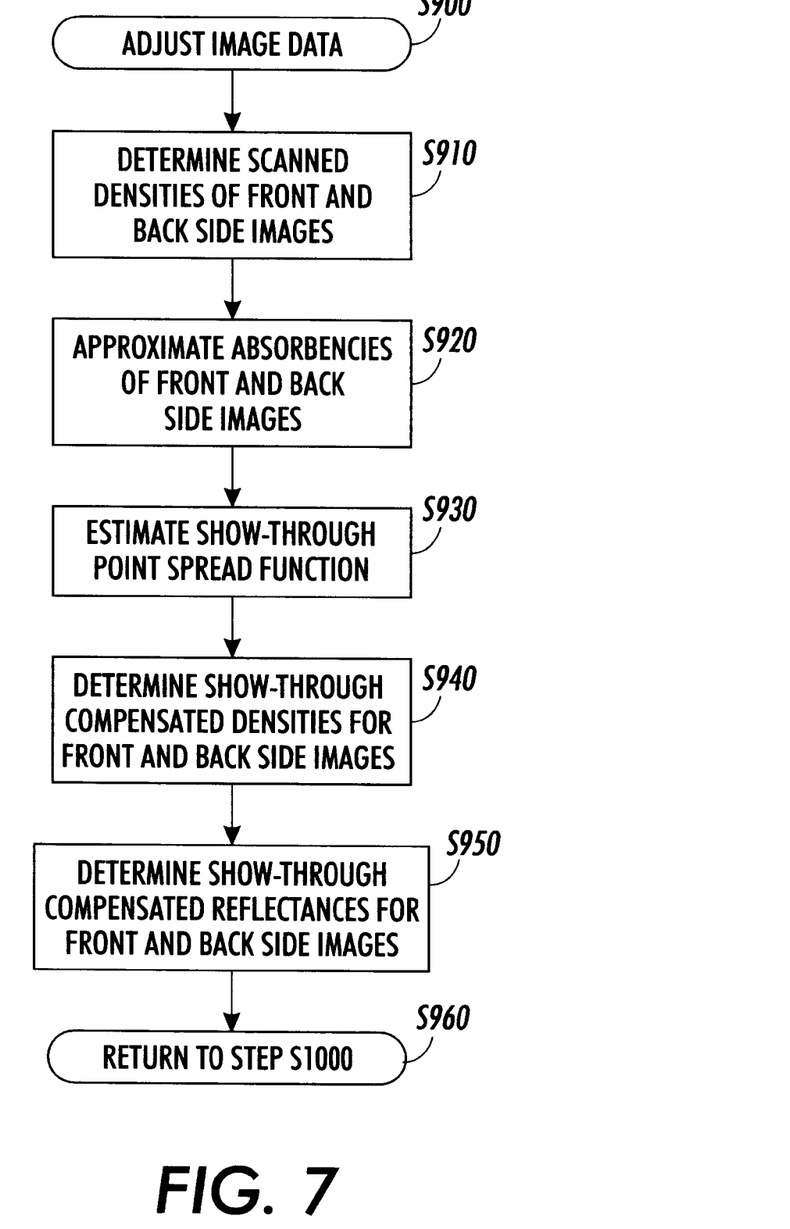
FIG. 7 is a flowchart outlining in greater detail one exemplary embodiment of the method for removing the show-through image information of step S900 of FIG. 6

FIG. 7 is a flowchart outlining one exemplary embodiment of the method for adjusting the image data of step S900 of FIG. 6. As shown in FIG. 7, beginning in step S900, control continues to step S910, where the scanned densities of the front and back sides of the image bearing substrate are determined based on the image data from the front and back side images. As described above, this may be done using the detected reflectances and Eq. 4 for the front side and a corresponding equation for the back side, for example.

Next, in step S920, the absorbencies of the front and back sides of the image bearing substrate are approximated. This may be done, for example, using Eqs. 14 and 15. Then, in step S930, the show-through point spread function of the image bearing substrate is estimated. As described above, this approximation may be performed automatically using linear prediction filters to approximate the show-through point spread function. Control then continues to step S940.

In step S940, densities for show-through compensated front and back sides of the image bearing substrate are determined from the scanned densities, the approximated absorbencies, and the estimated show-through point spread function. This may be done, for example using Eqs. 12 and 13. Then, in step S950, show-through compensated reflectances for the front and the back side images are computed, for example, by using Eqs. 16 and 17. Next, in step S960, control returns to step S1000 in FIG. 6.

The above described equations may be applied to each pixel, group of pixels, and the like, of an image either through hardware, software, or a combination of hardware and software. The choice of hardware or software may depend on the speed and efficiency requirements of the system on which the show-through cancellation is implemented.

As shown in FIGS. 1 and 2, the show-through image information removal device 200 may be implemented on a general purpose or special purpose computer. However, the show-through image information removal device 200 can also be implemented on a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which a finite state machine capable of implementing the flowcharts shown in FIGS. 6 and 7 can be used to implement the show-through image information removal device 200 of this invention.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention. In particular, the different functions described herein may be approximated, for example, using look-up tables for efficient implementation.

What is claimed is:

1. A method for removing show-through image information from image data generated by scanning an image bearing substrate, comprising:
    receiving the image data for a front side image on the image bearing substrate and a back side image on the image bearing substrate;
    determining scanned density data and approximate absorbency data for the front side image on the image bearing substrate and the back side image on the image bearing substrate based on the received image data for the front side image and the back side image;
    determining show-through compensated density data for at least one of the front side and the back side images based on the received image data, the scanned density data and the approximate absorbency data.

2. The method of claim 1, further comprising transforming the show-through compensated density data for one or both of the front and back side images into show-through compensated reflectance image data.

3. The method of claim 1, wherein determining the show-through compensated density data includes:
    spatially filtering the absorbency data for at least one of the front and back side images; and
    subtracting the spatially filtered absorbency data from the scanned density data for the other of the front and back side images.

4. The method of claim 3, wherein the spatial filtering includes using a filter corresponding to a pre-determined show-through point spread function.

5. The method of claim 3, wherein the spatial filtering uses a filter corresponding to a show-through point spread function estimated from the scanned data for the two sides.

6. The method of claim 5, wherein the spatial filtering is performed using a digital filter.

7. The method of claim 6, wherein the digital filter is an adaptive filter.

8. The method of claim 1, wherein determining the scanned density data for the front side on the image bearing substrate and determining the scanned density data for the back side on the image bearing substrate comprises determining a logarithm of the ratio of the received image data for a region of the image bearing substrate containing an image and for a region of the image bearing substrate having no image on either the front or the back sides.

9. The method of claim 1, wherein the scanned density of the back side image is determined using the relationship:

$$D_b^s(x, y) = -\ln(R_b^s(x,y)/R_p^w), \text{ and}$$

the scanned density of the front side image is determined using the relationship:

$$D_f^s(x, y) = -\ln(R_f^s(x,y)/R_p^w).$$

10. The method of claim 1, wherein the absorbency of the back side image layer is approximated using the relationship:

$$A_b(x,y) \approx 1 - R_b^s(x, y)/R_p^w, \text{ and}$$

the absorbency of the front side image layer is determined using the relationship:

$$A_f(x,y) \approx 1 - R_f^s(x, y)/R_p^w.$$

11. The method of claim 1, wherein determining show-through compensated density data further comprises:
    determining the show-through compensated density data for the front side image using the relationship:

$$D_f(x, y) = D_f^s(x, y) - H(x, y) \hat{x} A_b(x, y), \text{ and}$$

determining the show-through compensated density data for the back side image using the relationship:

$$D_b(x, y) = D_b^s(x, y) - H(x, y) \hat{x} A_f(x, y).$$

12. A show-through image information removal apparatus for removing show-through image information from image data generated by scanning an image bearing substrate having a front side image and a back side image, comprising:
    an input/output interface;
    a memory; and
    a show-through image information compensation device;
    wherein:
        image data for the front side image and the back side image is received through the input/output interface and stored in the memory, and the show-through compensation device determines scanned density data and approximate absorbency data for the front side image on the image bearing substrate and the back side image on the image bearing substrate based on the received image data for the front side image and the back side image and determines show-through compensated density data for at least one of the front side and the back side images based on the received image data, the scanned density data and the approximate absorbency data.

13. The apparatus of claim 12, further comprising a data alignment circuit for aligning image data of the front side image of the image bearing substrate with image data of the back side image of the image bearing substrate.

14. The apparatus of claim 13, wherein the show-through image information compensation device comprises:
   means for determining scanned density data for the front side image on the image bearing substrate and the back side of the image bearing substrate based on the received image data for the front side image and the back side image;
   means for approximating an absorbency of the front side and back side of the image bearing substrate and estimating a show-through point spread function for the image bearing substrate;
   means for determining show-through compensated density data for the front side and back side of the image bearing substrate based on the scanned density data, the approximated absorbencies and the estimated show-through point spread function for the image bearing substrate.

15. The apparatus of claim 14, wherein the scanned density data is based on a linearized relationship between the image data for the front side and the image data for the back side of the image bearing substrate and the scanned density.

16. The apparatus of claim 14, wherein the estimated show-through point-spread function is estimated using a digital filter.

17. The apparatus of claim 16, wherein the digital filter is an adaptive filter.

18. The apparatus of claim 14, wherein the show-through image information compensation device determines the scanned density data for the front side image on the image bearing substrate and the back side image on the image bearing substrate by determining a logarithm of a ratio of the received image data of a region having an image on the image bearing substrate and received image data of a region having no image on either side of the image bearing substrate.

19. The apparatus of claim 12, wherein the scanned density of the back side image is determined by the show-through image information compensation device using the relationship:

$$D_b^s(x, y) = -\ln(R_b^s(x,y)/R_p^w), \text{ and}$$

the scanned density of the front side image is determined by the show-through cancellation device using the relationship:

$$D_f^s(x, y) = -\ln(R_f^s(x,y)/R_p^w).$$

20. The apparatus of claim 12, wherein the absorbency of the back side image layer is approximated by the show-through image information compensation device using the relationship:

$$A_b(x,y) \approx 1 - R_b^s(x, y)/R_p^w, \text{ and}$$

the absorbency of the front side image layer is determined by the show-through cancellation device using the relationship:

$$A_f(x,y) \approx 1 - R_f^s(x, y)/R_p^w.$$

21. The apparatus of claim 12, wherein the show-through image information compensation device determines show-through compensated density data by determining the show-through compensated density data for the front side image using the relationship:

$$D_f(x, y) = D_f^s(x, y) - H(x, y) \hat{x} A_b(x, y), \text{ and}$$

determining the show-through compensated density data for the back side image using the relationship:

$$D_b(x, y) = D_b^s(x, y) - H(x, y) \hat{x} A_f(x, y).$$

22. An image forming device including the show-through image information removal apparatus of claim 12.

* * * * *

UNITED STATES PATENT AND TRADEMARK OFFICE
CERTIFICATE OF CORRECTION

PATENT NO. : 6,288,798 B1
DATED : September 11, 2001
INVENTOR(S) : Gaurav Sharma It is certified that error appears in the above-identified patent and that said Letters Patent is hereby corrected as shown below:

<u>Title page,</u>
"[75], Inventor, Gauray Sharma, Webster, NY (US)" to
-- [75], Inventor, Gaurav Sharma, Webster, NY (US) --

Signed and Sealed this

Ninth Day of April, 2002

*Attest:*

*Attesting Officer*

JAMES E. ROGAN
*Director of the United States Patent and Trademark Office*